(12) United States Patent
Baggs et al.

(10) Patent No.: US 6,420,976 B1
(45) Date of Patent: Jul. 16, 2002

(54) UNDERWATER HYDROCARBON PRODUCTION SYSTEMS

(75) Inventors: Christopher David Baggs; Steven Robert Powell, both of Bristol (GB)

(73) Assignee: ABB Seatec Limited, Bristol (GB)

( * ) Notice: Subject to any disclaimer, the term of this patent is extended or adjusted under 35 U.S.C. 154(b) by 0 days.

(21) Appl. No.: 09/208,243

(22) Filed: Dec. 9, 1998

(30) Foreign Application Priority Data

Dec. 10, 1997 (GB) .............................................. 9726167

(51) Int. Cl.$^7$ ................................................. G01V 3/00
(52) U.S. Cl. ................. 340/853.3; 340/850; 340/855.8; 166/250.15; 166/373; 318/434
(58) Field of Search ............................... 340/850, 853.3, 340/855.8; 166/373, 250.15, 385; 318/434

(56) References Cited

U.S. PATENT DOCUMENTS

| | | | | |
|---|---|---|---|---|
| 3,777,812 A | * | 12/1973 | Burkhardt et al. | 166/338 |
| 4,309,734 A | * | 1/1982 | Warren | 361/58 |
| 4,646,083 A | * | 2/1987 | Woods | 340/856 |
| 4,901,069 A | * | 2/1990 | Veneruso | 340/854.8 |
| 5,048,914 A | * | 9/1991 | Sneddon | 385/53 |
| 5,238,070 A | * | 8/1993 | Schultz et al. | 166/386 |
| 5,251,703 A | * | 10/1993 | Skinner | 166/374 |
| 5,256,844 A | * | 10/1993 | Grosvik et al. | 219/629 |
| 5,444,184 A | * | 8/1995 | Hassel | 174/113 R |
| 5,923,136 A | * | 7/1999 | Baerd | 318/434 |
| 6,150,954 A | * | 11/2000 | Smith | 340/854.6 |

FOREIGN PATENT DOCUMENTS

| | | |
|---|---|---|
| EP | 0027025 | 9/1980 |
| GB | 2059483 A | 1/1980 |
| GB | 2194980 A | 7/1987 |
| GB | 2299108 A | 3/1996 |

* cited by examiner

*Primary Examiner*—Michael Horabik
*Assistant Examiner*—Albert K. Wong
(74) *Attorney, Agent, or Firm*—Donald C. Casey, Esq.

(57) ABSTRACT

A hydrocarbon production system comprises a topside installation connected to a underwater distribution unit 4 by an umbilical 3. The unit 4 is connected to Christmas Trees 8, 9 and 10 by respective ones of jumper interconnects 11, 12 and 13. Each Christmas Tree may comprise one or more of an electrical actuator 14, flow rate control choke 16, pressure and/or temperature transducers 18, down hole measurement transducers 18a and/or a down hole safety valve 21. Electrical power is transmitted to the unit 4 by a high voltage transmission cable forming part of the umbilical 3. A transformer forming part of the unit 4 steps down the voltage transmitted over the umbilical 3 to a level suitable for use by the electrical devices 14, 16 and 21. Power and control of the devices 14, 16, 18, 18a, 21 is effected by an underwater controller 5, 6, 7 associated with its respective Christmas Tree 8, 9, 10. Control and measurement data may be effected between the topside station 2 and the Christmas Trees 8, 9, 10 by communication signals modulated onto the high voltage transmission cable, a low voltage transmission line or a dedicated communications line forming part of the umbilical 3. In other embodiments (FIG. 3, FIG. 4, not shown) one or more field buses are used to communicate data and power to the devices 14, 16, 18, 18a and 21 and an underwater controller 5, and/or between the unit 4 and a plurality of underwater controllers.

13 Claims, 5 Drawing Sheets

UNDERWATER HYDROCARBON PRODUCTION SYSTEMS

FIELD OF THE INVENTION

The present invention relates to underwater hydrocarbon production systems.

BACKGROUND OF THE INVENTION

In producing hydrocarbon products from a reservoir located beneath a seabed, it is usual, once a well has been drilled, to insert production tubing thereedown to the reservoir and locate a "Christmas Tree" containing a number of flow control valves at the mouth of the borehole on the seabed.

It is known for each Christmas Tree, of which there will be one per well, to comprise a number of gate valves, each valve having an associated hydraulic actuator. The Christmas Tree will usually have also one or more temperature and/or pressure transducers. It is common also to interpose a downhole safety valve along with its associated hydraulic actuator a distance beneath the Christmas Tree in the production tubing. A Christmas Tree is expected to operate with minimum maintenance for, typically, twenty years.

In conventional systems, each Christmas Tree would be connected to a topside installation, comprising a hydraulic power unit and a user operated control system, by a composite electrical/hydraulic umbilical, hereinafter referred to as an umbilical. The umbilical contains one or more hydraulic power lines which terminate in one or more electrically controlled hydraulic valves which, on reception of control signals from the topside control system, connect the hydraulic power to the appropriate hydraulic actuators. The umbilical will also comprise an additional line or lines such as electrical conductors for transmittal of control signals from the topside control system and of measurement data from subsea measurement transducers, valve status information and the like, to the control system, and may also comprise liquid flow lines for carrying chemicals from the surface installation for injection into a production flowline or down the well. As the umbilical can be tens of kilometres long, it can be very costly to manufacture and its high weight can make it difficult and/or expensive to install. Although such hydraulic systems tend to be very reliable, they do have drawbacks. Firstly, in an emergency shut down, it may be necessary to bleed hydraulic fluid back up the hydraulic power lines of the umbilical until the pressure has depleted to the point where subsea venting can occur. In a system where a large number of wells are fed by a small number of hydraulic lines, this bleeding may take a significant period of time. Secondly, the hydraulic power unit required at the surface installation is both expensive and bulky. If the surface installation is a fixed or floating oil production facility, where space can be very expensive, the effective cost of maintaining a hydraulic power unit can be significant.

In addition, hydraulic systems of this kind have drawbacks in that hydraulic actuators are usually vented to sea, and that split or holed umbilical lines can also result in large quantities of hydraulic fluid leaking into the sea.

Current oil exploration necessitates the drilling of subsea wells at progressively increasing water depths, with attendant technical problems. For example, the use of hydraulic systems becomes less attractive as they have to be modified to be able to cope reliably with the increasing static head of hydraulic fluid that exist in the hydraulic power lines of the umbilical. Conventional hydraulic systems are also limited in the maximum temperature at which they will reliably operate, making their use in downhole safety valve actuators in high temperature production wells problematic.

SUMMARY OF THE INVENTION

In accordance with the present invention, an underwater hydrocarbon production system comprises:
- a high voltage alternating current power transmission cable;
- a transformer to convert the high voltage power from the power transmission cable to a lower voltage;
- at least one electrically powered underwater device;
- a remotely located operator station to provide a control signal to control the at least one electrically powered underwater device; and
- an underwater control means to control connection of said lower voltage electrical power to the electrically powered underwater device in response to said control signal.

An underwater hydrocarbon production system in accordance with the present invention may allow more flexible system architecture than conventional systems, which may thus allow different applications to be accommodated without extensive system re-design. Also, the underwater components of the system may be lighter in weight than those of conventional systems, allowing more simple and cheap installation and retrieval of these components. Especially as fewer or no hydraulic components are required in this system, the cost of the overall system may be considerably less than that of a conventional system. Using the present invention, it may not be necessary to provide a hydraulic power unit on a topside installation, which can result in significant cost saving. The present invention may also overcome some or all of the drawbacks associated with hydraulic power transmission and/or control of hydraulic devices. Preferably the operator station is surface located.

One or more of said underwater devices may comprise an electrically powered actuator, in which case it or they may be an electro-hydraulic actuator.

The underwater device may have a low power latch associated therewith and the control means may further comprise latch control means operable to control connection of a latching electricity supply to the low power latch. This may allow the use of fail-safe actuators and the like to remain actuated with only low power consumption. The low voltage electrical power may in this case be disconnected from the underwater device when the associated low power latch is energised. This allows the latching electricity supply to be derived from the low voltage electrical power provided by the transformer, which may allow the umbilical to contain only a small number of electrical conductors. Alternatively, the latching electricity supply may be provided by the operator station on a low power transmission cable distinct from the high voltage transmission cable and from the low voltage electricity supply. This would allow emergency shut-down of a Christmas Tree to be achieved from the operator station without involving the underwater control means.

The operator station may further comprise a high voltage electrical power supply to energise the high voltage power transmission cable. This could allow the underwater components of the system to be fully supported by a single umbilical from the operator station. Alternatively, a high power underwater electricity supply is used to energise the high voltage power transmission cable. With the latter alternative, the presence of an underwater electricity supply intended for other underwater electrical power equipment or an underwater high power transmission cable can be used to render an underwater hydrocarbon production system specific electricity supply unnecessary and/or reduce the number of conductors carried underwater from the operator station over the umbilical.

The control signal may be carried on the high voltage transmission cable, which may reduce the number of electrical conductors required in the umbilical, or the control signal could instead be carried on the low power transmission cable, which may provide more reliable and/or higher data rate communications than the case where the control signal is carried on the high voltage transmission cable. This is because there are less likely to be transient signals present on the low power transmission cable, which signals can negatively affect maximum data rates.

Alternatively, the control signal can be carried on an optical fiber. The existence of an optical fiber in the umbilical can allow high communication data rates both to and from the operator station.

The control means may be operable to control connection of said low voltage electrical power to an electrically powered underwater device by providing an address signal corresponding to an address of the underwater device on a fieldbus connected to at least one other electrically powered underwater device.

The control means may further comprise monitoring means to monitor current flowing to the underwater device. Here, the monitoring means may be able to detect anomalies in the current monitored, thereby allowing condition monitoring of the electrically powered devices to be performed.

The system may further comprise electrical protection means operable, on detection of an electrical fault in a component external to the control means, to disconnect electrically that component from the control means. Here, the electrical protection means may comprise means to provide on an auxiliary output a signal thereof indicative of said detection. Preferably, a plurality of said protection means are associated with the control means and the auxiliary output of each protection means is connected to control a respective switching device in a ladder network arrangement.

BRIEF DESCRIPTION OF THE DRAWINGS

Embodiments of the present invention will now be described, by way of example only, with reference to the accompanying drawings, in which:

Referring to FIG. 1, the hydrocarbon production system 1 comprises generally a topside installation 2 which may be located on a fixed or floating platform, on a ship or may be shore based, connected by an umbilical 3 to an underwater distribution unit 4. First, second and Nth underwater controllers 5, 6 and 7, mounted on or adjacent respective first, second and Nth Christmas Trees 8, 9 and 10, are connected to the underwater distribution unit 4 by respective jumper interconnects 11, 12 and 13.

Figure 1:
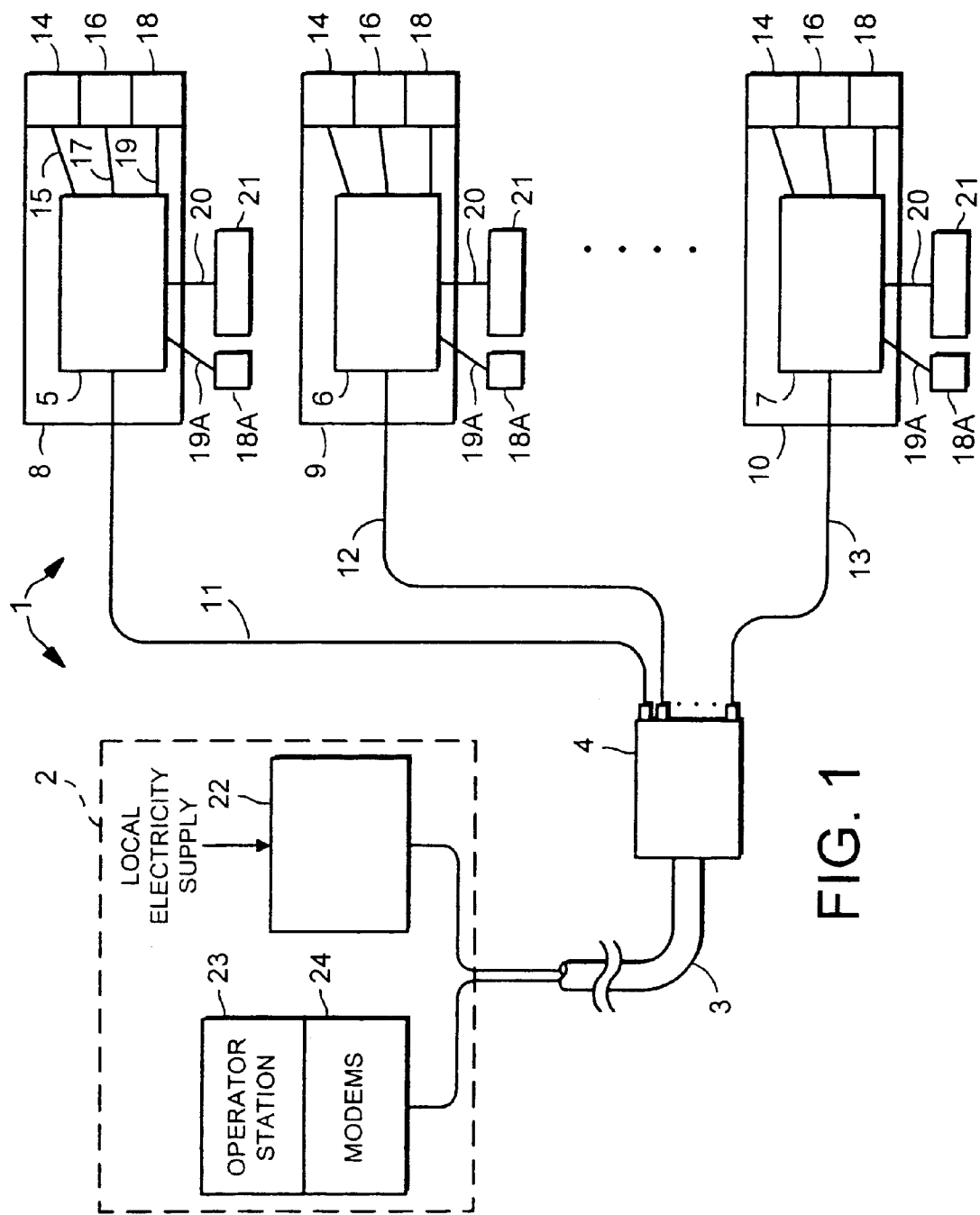
FIG. 1 shows a hydrocarbon production system in accordance with the present invention.

Each Christmas Tree, for example the Christmas Tree 8, includes a plurality of valves each associated with a respective electrically powered actuator, of which one is shown at 14.

The actuator 14 is electrically connected to the underwater controller 5 by a multi-core cable 15. The other, unshown, actuators are similarly connected to the controller 5. The Christmas Tree 8 includes also one or more electrically powered actuators associated each with a flow rate control choke, one of which is indicated at 16, connected to the underwater controller 5 by respective multi-core cables, the cable associated with the choke 16 being indicated at 17.

Located at certain points within the Christmas Tree 8 are a number of pressure and/or temperature transducers, one of which is indicated at 18, which continually send measurement signals to the controller 5 on their respective multi-core electrical cable, the cable corresponding to the transducer 18 being indicated at 19. A number of down hole measurement transducers one of which is shown at 18A, are similarly connected to the controller by respective multi-core cables, such as a cable 19A.

The controller 5 also is electrically connected by a multi-core cable 20 to an electrically powered downhole safety valve and associated actuator 21 located down the unshown production tubing beneath the Christmas Tree 8. Thus, the controller 5 is connected to each electrically powered underwater control device, of which the actuator 14, the choke 16 and the downhole safety valve actuator 21 are shown; and to each measurement transducer, of which the transducers 18 and 18A are shown, associated with the Christmas Tree 8. This connection is made in such a way that the devices 14, 16 and 21 are not connected to each other but are connected only to the controller 5. This can be described as "star" connection.

The topside installation 2 comprises a step-up transformer 22 which is arranged to convert a local electricity supply to, typically, a 3000 V three-phase alternating current electricity supply for transmission on a high voltage power transmission cable forming part of the umbilical 3. The topside installation further includes an operator station 23 comprising a computer and a user interface by which an operator can both see information provided by the measurement transducers 18 and 18A associated with each of the Christmas Trees 8, 9, 10, and enter control commands when the operator wishes to control any of the actuators 14, the chokes 16 and the downhole safety valve actuators 21. Alternatively, the operator station 23 may be an automatic computer controlled station in which measurement information is applied to an algorithm or to a logic device and control commands are generated accordingly. In either case, one or more control signals are generated by the operator station from the control commands and are transmitted over the umbilical 3 on one or more communications lines by way of one or more modems 24.

Although this specific example uses a voltage of 3000V, it will be understood that the magnitude of the voltage transmitted over the high voltage ac power transmission cable is chosen according to the particular implementation of the invention. The voltage chosen will depend in particular on such factors as the diameter of the conductors of the power transmission cable, the length of the power transmission cable and the power required from the subsea transformer.

The umbilical 3 may be one of many different configurations, the most suitable configuration for a particular system being dependent mostly on the distance between the topside installation 2 and the distribution unit 4 or the controller 5, 6, 7, on the required rate of data communications to and from the operator station 23, and whether, and if so how much, redundancy is required.

The underwater distribution unit 4 includes an unshown underwater step-down transformer arranged to receive the electrical power transmitted over the high voltage power transmission cable in the umbilical 3 and transform it into a low voltage three-phase electrical power supply, which is then distributed to each of the controllers 5, 6, 7 by electrical power conductors forming part of the respective jumper interconnect 11, 12, 13. The low voltage three-phase electricity supply may be 140V or 415V, although the voltage may depend largely on the underwater devices used in the system 1. This supply is preferably a medium power supply, which may be in the 1–10 kW range.

The distribution unit 4 also includes unshown short-circuit protection circuitry operative to detect a short circuit condition on any of the electrical power conductors or on a winding of the step-down transformer, and provide appropriate disconnection where and when necessary. The short-circuit protection circuitry may, when such a detection is made, transmit to the operator station 23 indicative data signals, which may include data indicating the identity of the electrical power conductor or transformer winding which has been disconnected.

The short-circuit protection circuitry, by disconnecting faulty electrical components, protects other system components from faults which could have resulted from that faulty component.

The distribution unit 4 receives control signals from the operator station 23 and relays these signals to the controllers 5, 6, 7 on a communications line or lines forming part of respective ones of the jumper interconnects 11, 12 and 13.

The relaying step may include decoding or demodulating, especially if the communications link between the operator station 23 and the distribution unit 4 is an optical link or is one in which data signals are superimposed onto the high voltage power transmission cable.

Because the controllers 5, 6 and 7 are essentially the same as each other, only the controller 5 will be described. The controller 5 receives the three-phase low voltage electrical power and the downlink communications provided by the distribution unit 4 on the respective ones of the power conductors and the communications line or lines forming parts of the jumper interconnect 11.

The controller 5 includes also an unshown underwater control means or module, preferably a processor, operative to receive control signals from the distribution unit 4 and to control connection of the three-phase low voltage electrical power to unshown controller power output terminals, which are electrically connected to the actuator 14, the flow rate control choke 16 and the downhole safety valve actuator 21 by respective multi-core cables 15, 17 and 20, accordingly. In this way, the actuator 14, the choke 16 and the downhole safety valve actuator 21, which all are electrically powered underwater devices, can be controlled by the operator station 23 to carry out their powered function almost instantaneously.

The control module has two further circuits or processor functions. Firstly, an unshown latch control circuit or processor is operative to connect a latching electricity supply, which may be derived from the low voltage electrical power supply, to a low power latch associated with each underwater device 14, 16, 21 when that underwater device has completed its powered function. In this way, fail safe underwater devices can be used without the low voltage electrical power supply being continuously applied to the device when a powered function has been completed. For the avoidance of doubt, a powered function is, in the case of an electric actuator, electrical actuation, which may be made against the force of a fail-safe return spring. It will be understood by the skilled person what is meant by the term powered function with regard to other types of electrically powered underwater control device.

Alternatively, the latching electricity supply may be provided directly by the operator station 23, separately to the low voltage power supply, and appropriately distributed by a suitable circuit in the underwater control means.

Secondly, an unshown transducer read circuit or processor function is operative to detect signals from the measurement transducers 18, 18A and generate measurement data representative of one or more measured parameters. Depending on the nature of the measurement transducers 18, 18A the controller 5 may also include an unshown transducer power supply means to energise the transducers 18, 18A or to provide an electrical signal which is affected by the transducer 18, 18A depending on a measurable parameter. The measurement data is transmitted as measurement signals to the operator station 23 via the distribution unit 4 on the reception of interrogation or request signals from the operator station. Advantageously, the interrogation signals are transmitted with the control signals on the communications line from the operator station 23 to the distribution unit 4. To avoid excessive complexity in the distribution unit 4, these interrogation signals may be relayed by the distribution unit 4 directly to all of the controllers 5, 6, 7. The controllers, or the control means therein, are each able to determine whether or not the interrogation signals are intended for it and to take action as necessary. The distribution unit 4 includes also an uplink communications device operable to receive measurement signals from the controllers 5, 6, 7 and transmit them to the operator station over the communications line or lines forming part of the umbilical 3.

As maintenance and/or replacement of underwater hydrocarbon production system components can be expensive, especially at substantial water depths, condition monitoring of such components would be desirable, although this is not easily achievable with components such as hydraulic actuators. In accordance with a preferred aspect of the present invention, the underwater controllers 5, 6, 7 further include an unshown electrically powered underwater device monitoring circuit or processor. In the case of underwater devices having electric motors and the like, the monitoring circuit or processor preferably monitors the current flowing in the multi-core cables between the controller, for instance the controller 5, and the underwater device, for instance the actuator 14. Preferably, performance monitoring can be achieved by monitoring the driving current, which is related to the torque generated by an electrical motor.

Particularly, the monitoring circuit or processor is operable to perform high speed sampling of signals provided by a current loop sensor associated with each conductor of the multicore cable. The monitoring circuit or processor can then monitor the profile of the current flow, or compare the profile to an expected profile stored in a memory, and identify anomalies, usually unexpected peaks, which indicate unusual friction or part-seizure in the mechanical operation of the actuator. Complete jamming of the mechanical operation can also be detected in this way.

The controller 5 may transmit data corresponding to all of the sampled information to the operator station 23 or, preferably, transmits only information relevant to an underwater device which is not correctly functioning. Of course, the monitoring circuit or processor need only operate when an underwater device is being powered, that is between switch on and switch off times.

Figure 2:
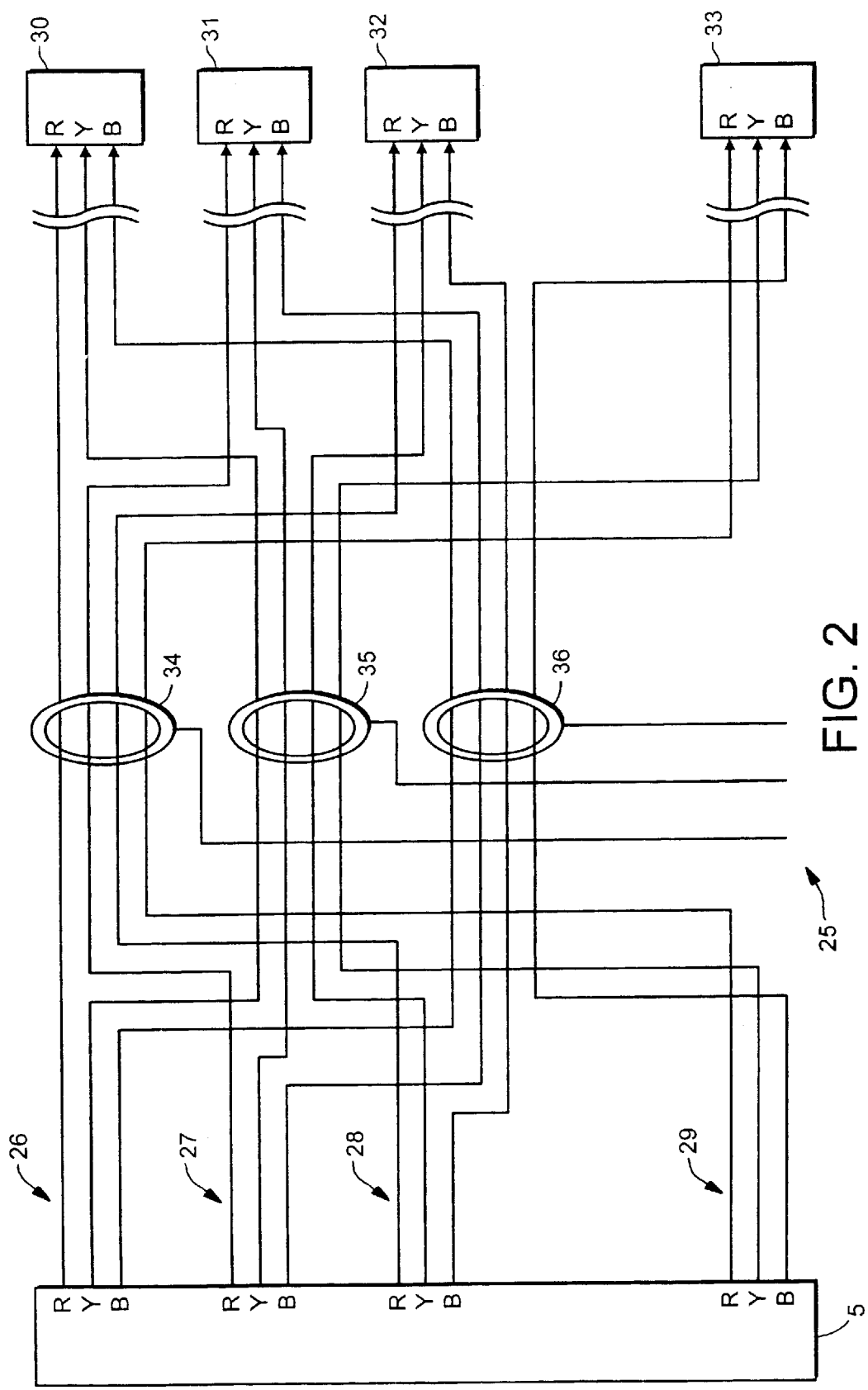
FIG. 2 shows a sensor arrangement used in the FIG. 1 system.

In systems where only one of the underwater devices associated with a controller 5, 6, 7 is electrically powered at a given time, either by suitable control or by system organisation, the loop sensors and multi-core cables associated with the electrically powered underwater devices may be arranged as shown in FIG. 2.

Referring to FIG. 2, the sensor arrangement 25 comprises red, yellow and blue phase conductors R, Y, B for each of first to fourth multi-core cables 26–29 extending from the controller 5 through red, yellow and blue phase loop sensors 34–36 to first to fourth electrical actuators 30–33. Each red phase conductor R passes through only the red phase loop sensor 34, and, it will particularly be noted from FIG. 2, that the yellow and blue phase conductors 35, 36 are similarly connected. Since only one of the actuators 30–33 is powered at any one time, only one wire R, Y, B through each sensor will be carrying current at any time, which thus can be unambiguously detected by the loop sensors 34–36. This sensor arrangement 25 minimises both the number of loop sensors and the number of loop sensor inputs to the monitoring circuit or processor.

Figure 3:
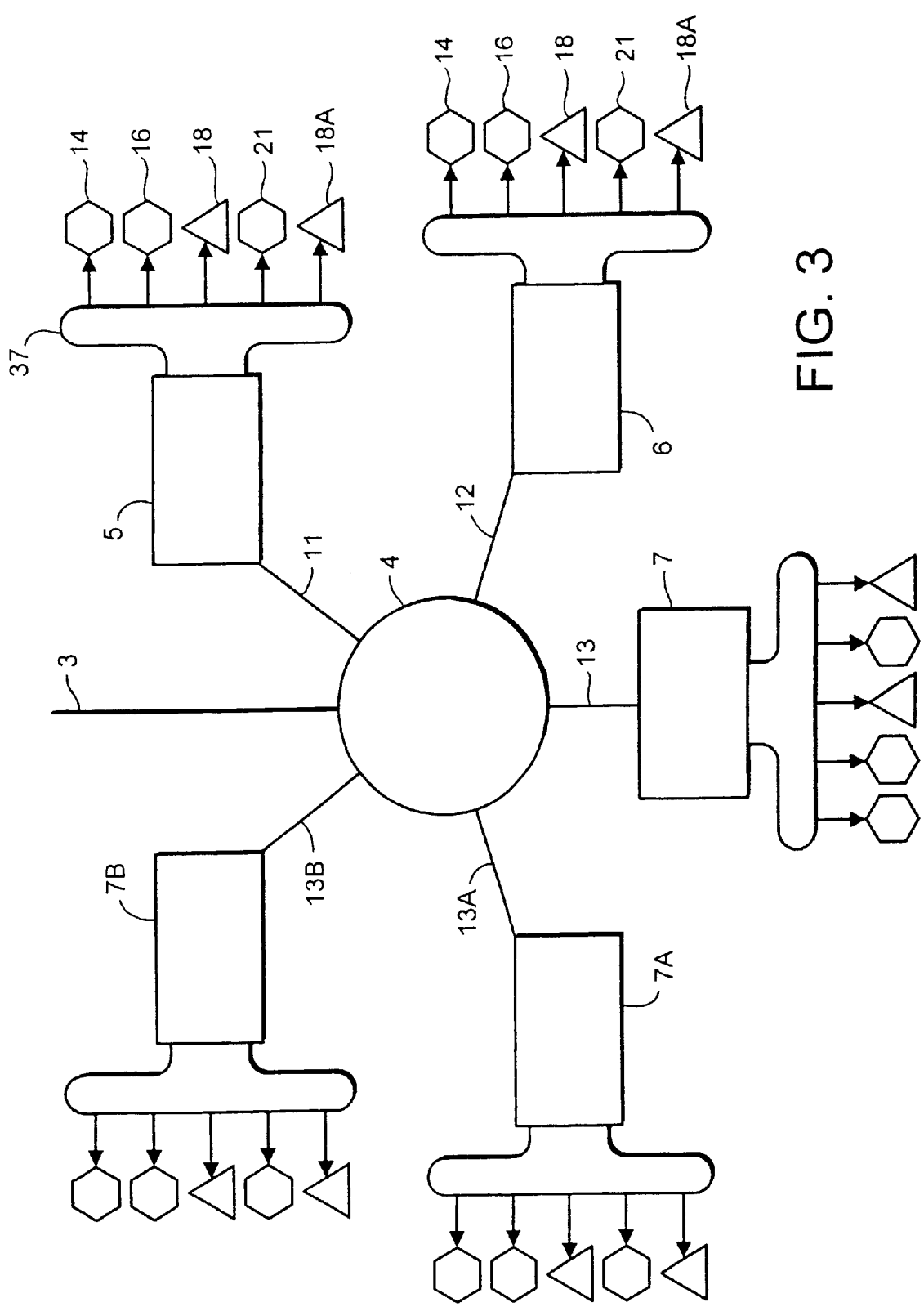
FIG. 3 shows part of a hydrocarbon production system in accordance with the present invention.

Instead of the underwater devices 14, 16, 21 and transducers 18, 18A being star connected to their associated controller 5, 6, 7, connection of these components could be achieved with a field bus. The underwater components of a underwater hydrocarbon production system, incorporating such connection, is shown in FIG. 3, in which the umbilical 3 connects the distribution unit 4 to the unshown topside installation, as in FIG. 1. First to fifth underwater controllers 5, 6, 7, 7A and 7B are connected to the distribution unit 4 by respective jumper interconnects 11, 12, 13, 13A and 13B in the same manner as that shown in FIG. 1. Each controller, for example the controller 5, is connected to an actuator 14, a flow rate control choke 16, a downhole safety valve actuator 21 and measurement transducers 18 and 18A on a bus 37. The bus 37 comprises a number of unshown electrical conductors including three phase low voltage electrical power conductors, dc power conductors and multiplexed bi-directional communication line conductors. The bus 37 extends from an output terminal of the controller 5 to an input terminal of each underwater device 14, 16, 21 and measurement transducer 18, 18A. The bus 37 may be driven by either but not both of two output terminals of the controller 5, in which case the bus 37 can be described as a looped bus. This system may be described as two level star-loop connected.

The use of the bus 37 reduces the number of low voltage electrical power drivers required in the controller 5. Each of the underwater devices 14, 16, 21 and measurement transducers 18, 18A include a local control module to detect when they are being addressed by the controller 5 and consequently perform their respective function. In the case of an electrically powered underwater device 14, 16, 21, the correct address causes the device 14, 16, 21 to activate unshown connection circuitry to connect the low voltage electricity supply on the power conductors of the bus 37 to electrically power the device 14, 16, 21. In the case of a measurement transducer 18, 18A, the detection of a correct address causes the local control module to communicate measurement signals over the communications lines of the bus 37.

As with the FIG. 1 embodiment, the FIG. 3 embodiment is suitable for use in oil fields where Christmas Trees in a group are spaced by up to a few kilometres on the sea or lake bed. Electrical power transmission over the umbilical 3 is advantageously high voltage to reduce the cost and weight of the large diameter conductors that would be needed for low voltage transmission over large distances. Low voltage power transmission over jumper interconnects 11–13 is not problematic as the resultant voltage drop is not significant. However, where the Christmas Trees of a group are sufficiently close together, the hydrocarbon production system of FIG. 4 may be preferable to the FIGS. 1 and 3 systems.

Figure 4:
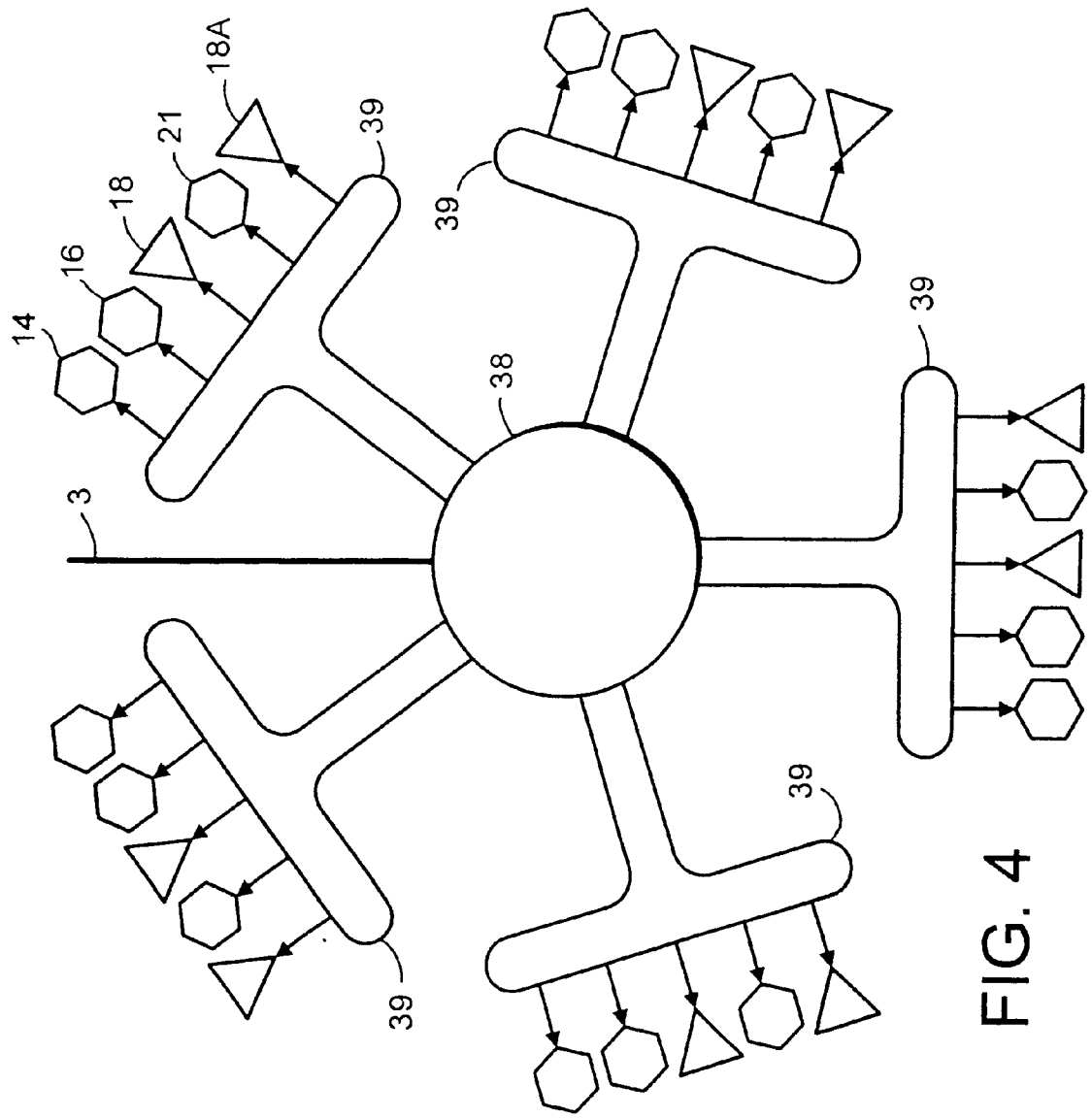
FIG. 4 shows part of a hydrocarbon production system in accordance with the present invention.

Referring to FIG. 4, the system is shown with an umbilical 3 from an unshown topside installation connecting with an underwater distribution and control device 38, which includes the main features of the distribution unit 4 and of the controllers 5, 6, 7, 7A and 7B of FIG. 3. The distribution and control device 38 has connections with first to fifth field buses 39, each associated with a respective Christmas tree. By combining the distribution unit and the controllers 5, 6, 7A, and 7B in this way, the amount of hardware can be reduced.

Although the embodiments have so far been described with reference to electric actuators and electric flow rate control chokes, the invention is applicable also to electro-hydraulic actuators and the like. Such an actuator comprises a hydraulic actuation system and an associated electrically powered hydraulic power unit. The controllers can in this way cause actuation on reception of a control signal by energising the appropriate hydraulic power unit. Here, the electrically powered function is hydraulic actuation. Such a system can be described as a distributed electro-hydraulic actuation system.

Furthermore, the controller 5 may be controlled to connect electrical power to an unshown underwater hydraulic power unit which is connected to each actuator 14 and flow rate control choke 16 associated with the Christmas tree 8 by a respective unshown hydraulic line. Here, electric control of a valve interposed in a hydraulic line can cause the powered function of the associated hydraulic device to be completed without the need for a large number of power driver circuits in the controller 5. For electric control of the valves in the hydraulic lines, only low power electrical drive circuits are required in the controller 5.

This system can be advantageous in that the underwater hydraulic power unit can store a significant amount of energy, as hydraulic pressure, which can allow more flexibility in the distribution and assignment of the electrical power available over the high voltage power transmission cable in the umbilical 3. This system is envisaged to allow more easily the present invention to be used to modify existing hydraulic underwater hydrocarbon production systems, and can be described as centralised electro-hydraulic actuation. Use of such a system can reduce peak power demands, and hence have a positive effect on system optimisation.

The electrical power output terminals of the controller are protected against both short circuit and open circuit conditions by the provision of an electrical protection means for each of the output terminal groups. Here, an output terminal group refers to the three conductors of a three-phase electrical power output.

The electrical protection means each are operative to disconnect the output terminals from their driving electricity supply on the detection of a fault in the power cable, or in an electrically powered device powered thereby, connected to those output terminals.

Advantageously, the electrical protection means include an auxiliary output terminal on which is provided a logic 1 output if the protection means is operating, and a logic 0 output otherwise. From the signal detected on this terminal, the control module of a controller 5–7B or of a distribution and control device 38 is operable to determine the status of the protection device. Preferably, status information is transmitted to the operator station 23 for condition monitoring therein.

Figure 5:
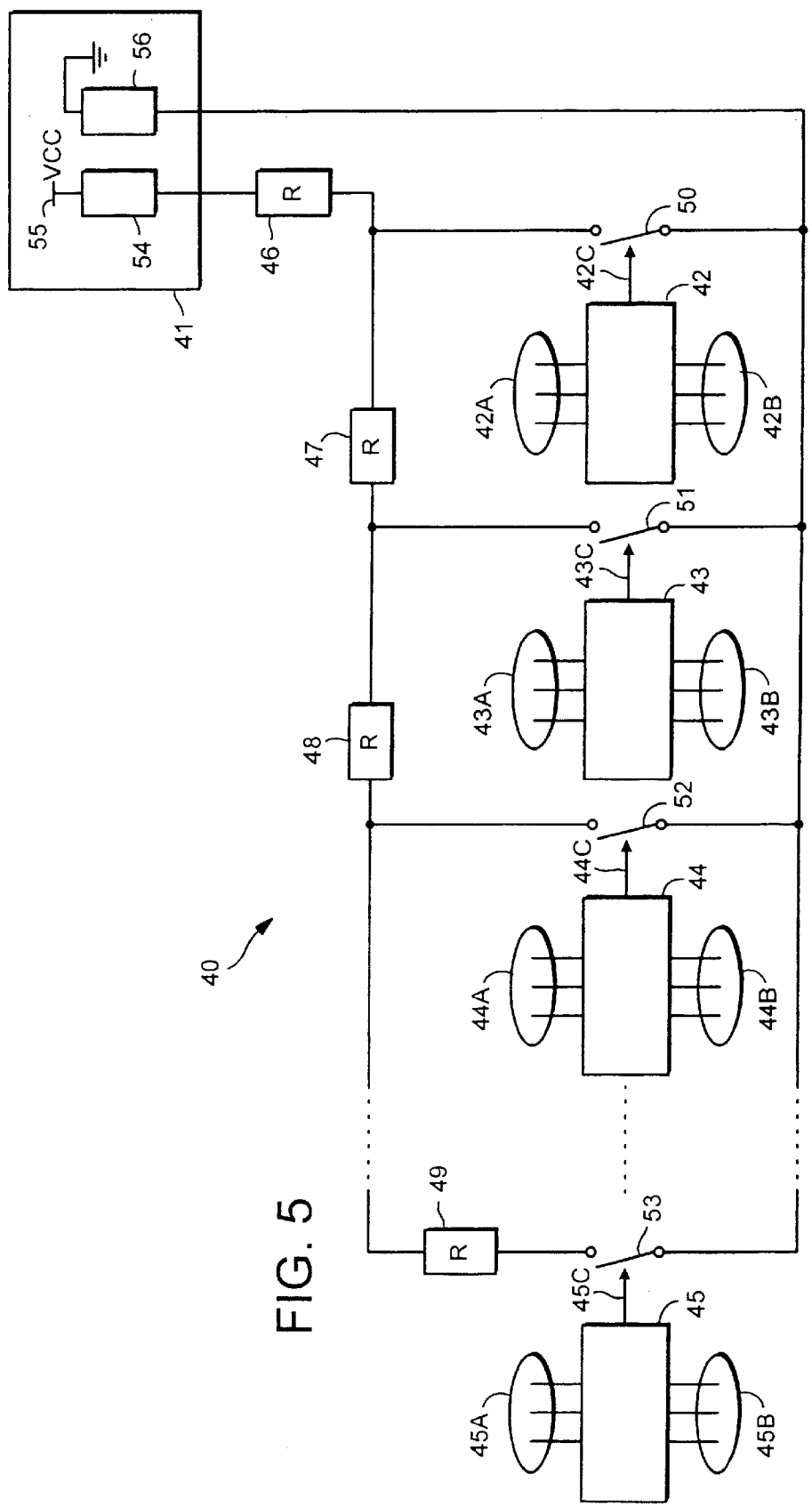
FIG. 5 shows a monitoring arrangement suitable for use in a hydrocarbon production system in accordance with the present invention.

The FIG. 5 monitoring arrangement may advantageously be used to minimise the number of monitoring terminals required to connect a number of electrical protection means to the control module.

Referring to FIG. 5, the monitoring arrangement 40 comprises a monitoring circuit 41, first, second, third and Nth electrical protection means 42, 43, 44 and 45, each including three-phase inputs 42A, 43A, 44A and 45A, three phase output terminals 42B, 43B, 44B and 45B and an auxiliary output terminal 42C, 43C, 44C and 45C, first, second, third and Nth resistors 46, 47, 48 and 49; and first, second, third and Nth switching devices 50, 5 1, 52 and 53. The arrangement of the resistors 46, 47, 48 and 49 and the switching devices 50, 51, 52 and 53 can be described as a ladder network arrangement.

The monitoring circuit 41 is operable to activate periodically a resistive current source 54, which then attempts to drive a current from a supply voltage rail 55 through the resistor 46. If none of the protection means 42, 43, 44 and 45 has operated, the auxiliary outputs terminals 42C, 43C, 44C and 45C will each be at logic 0 and hence each of the switching devices 50, 51, 52 and 53 will be non-conducting. In this case, no current will flow and the voltage across a measurement resistor 56 will thus be zero. The monitoring circuit 41, on detecting this condition, will determine that none of the protection means 42, 43, 44 and 45 have operated.

When a protection means 42, 43, 44, 45 operates, its associated switching device 50, 51, 52, 53 will conduct, and a resistive circuit between Vcc and ground potential will thus be formed. As each of the resistors 46–49 has the same resistance R, the resistance of this circuit will be equal to the resistance of the current source 54 plus the resistance of the measurement resistor 56 plus an integer multiple of R. For example, operation of the protection means 43 will cause the device 51 to conduct and the monitoring circuit will, on activation of the current source 54, detect a voltage across the measurement resistor having a value unique to, and thus indicative of, that protection means 43. The monitoring circuit 41 may determine which of the protection means 42, 43, 44, 45 is operated by appropriate calculation using knowledge of the value of R, the resistances of the measurement resistor 56 and the current source 54 and the measured voltage, or it may compare the measured voltage to predetermined values stored in an unshown look-up table.

In a system where only one of the protection devices 42, 43, 44 and 45 is activated at a time, for example where only one electrically powered device is operable at a time, the monitoring circuit 41 will unambiguously detect which protective device 42, 43, 44, 45 has operated and, thus, the circuit in which a fault lies by comparing the voltage measured across the measurement resistor to values stored in the look-up table or by the above mentioned calculation.

When an electric motor or a similar device is switched on, certain transient currents are generated. In normal circumstances these currents are not problematic. However, where the driving electrical power is transmitted over a high voltage power transmission cable of tens of kilometres in length and of small cross-sectional area conductors, the transient currents can cause significant problems. It is thus desirable to optimise the topside transformer 22 and the underwater transformer by matching their characteristics to the impedance of the high voltage electrical power cable conductors and to the loads, i.e. the electrically powered underwater devices.

To achieve this, it is necessary to analyse the electric circuits, or equivalent circuits, of the electrically powered devices and of the high voltage electrical power cable conductors under both static and transient conditions, preferably using modelling computer software, and selecting optimum transformer characteristics accordingly.

In each of the above described embodiments, the distribution unit 4 and the controllers 5, 6, 7, or the distribution and control unit 38 are sealed from their external environment. The underwater transformer is contained within an oil-filled pressure compensated housing, with incoming and outgoing cables connecting to the winding by through-housing electrical connectors. The electrical circuits and switchgear of the units 4–7 and 38 are contained each in an unshown one-atmosphere pressure isolating housing, although pressurecompensated housings or hybrid housings may equally well be used.

Also, although the above description has made reference mostly to a simplex system, redundant components may be used, where appropriate, to reduce maintenance intervals.

What is claimed is:

1. An underwater hydrocarbon production system comprising:
   a high voltage alternating current power transmission cable;
   a voltage transformer to convert the high voltage power from the power transmission cable to a lower voltage;
   at least one electrically powered underwater device;
   a remotely located operator station providing a control signal to control the at least one electrically powered underwater device; and
   an underwater control means for controlling connection of said lower voltage electrical power to said electrically powered underwater device in response to said control signal.

2. The system of claim 1, wherein the underwater device has a low power latch associated therewith and the control means further comprises latch control means for controlling connection of a latching electricity supply to the low power latch.

3. The system of claim 1, wherein said operator station further comprises a high voltage electrical power supply which energizes the high voltage power transmission cable.

4. The system of claim 1, wherein a high power underwater electricity supply energizes the high voltage power transmission cable.

5. The system of claim 1, wherein the control means is operable to control connection of said low voltage electrical power to an electrically powered underwater device by providing an address signal corresponding to an address of the underwater device on a field bus connected to at least one other electrically powered underwater device.

6. The system of claim 1, further comprising at least two underwater control means each coupled to at least one associated underwater device, said underwater control means each being connected to an electrical power distribution means associated with said transformer by respective low voltage electrical power transmission cables.

7. The system of claim 1, wherein the control means further comprises means for monitoring current flowing to at least one underwater device.

8. The system of claim 7, further comprising electrical protection means operable, on detection of an electrical fault in a component external to said control means, for electrically disconnecting that component from said control means.

9. The system of claim 8, wherein said electrical protection means further comprises means for providing an auxiliary output to a signal indicative of said detection.

10. The system of claim 8, wherein a plurality of said protection means are provided with said control means and the auxiliary output of each protection means is connected to control a respective switching device in a ladder network arrangement.

11. The system of claim 7, wherein a plurality of underwater devices are provided and are arranged to be individually electrically powered by respective power cables each comprising at least first and second conductors, further comprising a sensor arrangement having a first current sensor surrounding every first conductor of said power cables.

12. The system of claim 11, further comprising a second current sensor surrounding every second conductor of the power cables.

13. The system of claim 11 wherein said electrically powered devices are three phase devices, said power cables comprising a third conductor and a third current sensor surrounding every third conductor of the power cables is provided.

* * * * *